United States Patent
de Bruyn et al.

(10) Patent No.: US 12,346,307 B2
(45) Date of Patent: Jul. 1, 2025

(54) RESOURCE VALIDATION SYSTEMS AND METHODS

(71) Applicant: Capital One Services, LLC, McLean, VA (US)

(72) Inventors: Carel de Bruyn, Prosper, TX (US); James Anthonyraj, Coppell, TX (US); David Duong, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/513,038

(22) Filed: Nov. 17, 2023

(65) Prior Publication Data

US 2025/0165458 A1   May 22, 2025

(51) Int. Cl.
*G06F 16/00* (2019.01)
*G06F 16/23* (2019.01)

(52) U.S. Cl.
CPC .................. *G06F 16/2365* (2019.01)

(58) Field of Classification Search
CPC .................................. G06F 16/2365
See application file for complete search history.

(56) References Cited

U.S. PATENT DOCUMENTS

| | | | |
|---|---|---|---|
| 6,915,454 B1* | 7/2005 | Moore | G06F 11/0709 717/124 |
| 10,162,850 B1* | 12/2018 | Jain | G06F 40/30 |
| 2008/0052253 A1* | 2/2008 | Edwards | G06Q 50/06 705/412 |
| 2017/0075948 A1* | 3/2017 | Watson | G06F 16/20 |
| 2020/0234342 A1* | 7/2020 | Santiago | G06F 16/9566 |
| 2020/0351345 A1* | 11/2020 | Bansod | G06F 11/1451 |
| 2022/0229829 A1* | 7/2022 | Dye | G06F 16/2365 |

* cited by examiner

*Primary Examiner* — Syed H Hasan
(74) *Attorney, Agent, or Firm* — Banner & Witcoff, Ltd.

(57) ABSTRACT

Techniques for improved data and/or resource validation provide a real-time validation of data and resources. A resource may include an aggregation of related data into a single unique unit. The validation may be performed based on one or more events or triggers, such as on the occurrence of a data change, deployment of an application, when the resource(s) are utilized, etc. The validation may be on demand (e.g., based on one or more events and/or triggers) and/or manually (e.g., via a call via an application program interface by a user).

20 Claims, 5 Drawing Sheets

RESOURCE VALIDATION SYSTEMS AND METHODS

FIELD OF USE

Aspects of the disclosure relate generally to resource validation, including validating data, such as a resource based on one or more events or triggers.

BACKGROUND

Conventional techniques for data and resource management are reactive and limited to downstream error detection resulting from invalid data upstream. Such techniques do not provide real-time detection of a data resource, and issues are detectable only after an occurrence of a downstream issue resulting from the invalid resource. Further, the detection of an invalid resource in such configurations is only upon a later use of the resource, resulting in a delayed detection of the invalid resource. With this delayed response, the invalid resource may be deployed to (or used by) multiple application before it is detected that the resource is invalid, resulting in reapplication of the resource following detection and a reduced availability of computing resources.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein generally improve resource validation by providing a real-time validation of data and resources, where a resource may include an aggregation of related data into a single unique unit. The validation may be performed based on one or more events or triggers, such as on the occurrence of a data change, deployment of an application, when the resource(s) are utilized, etc. The validation may be on demand (e.g., based on one or more events and/or triggers) and/or manually (e.g., via a call via an application program interface (API) by a user).

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. As such, corresponding apparatus, systems, and computer-readable media are also within the scope of the disclosure.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
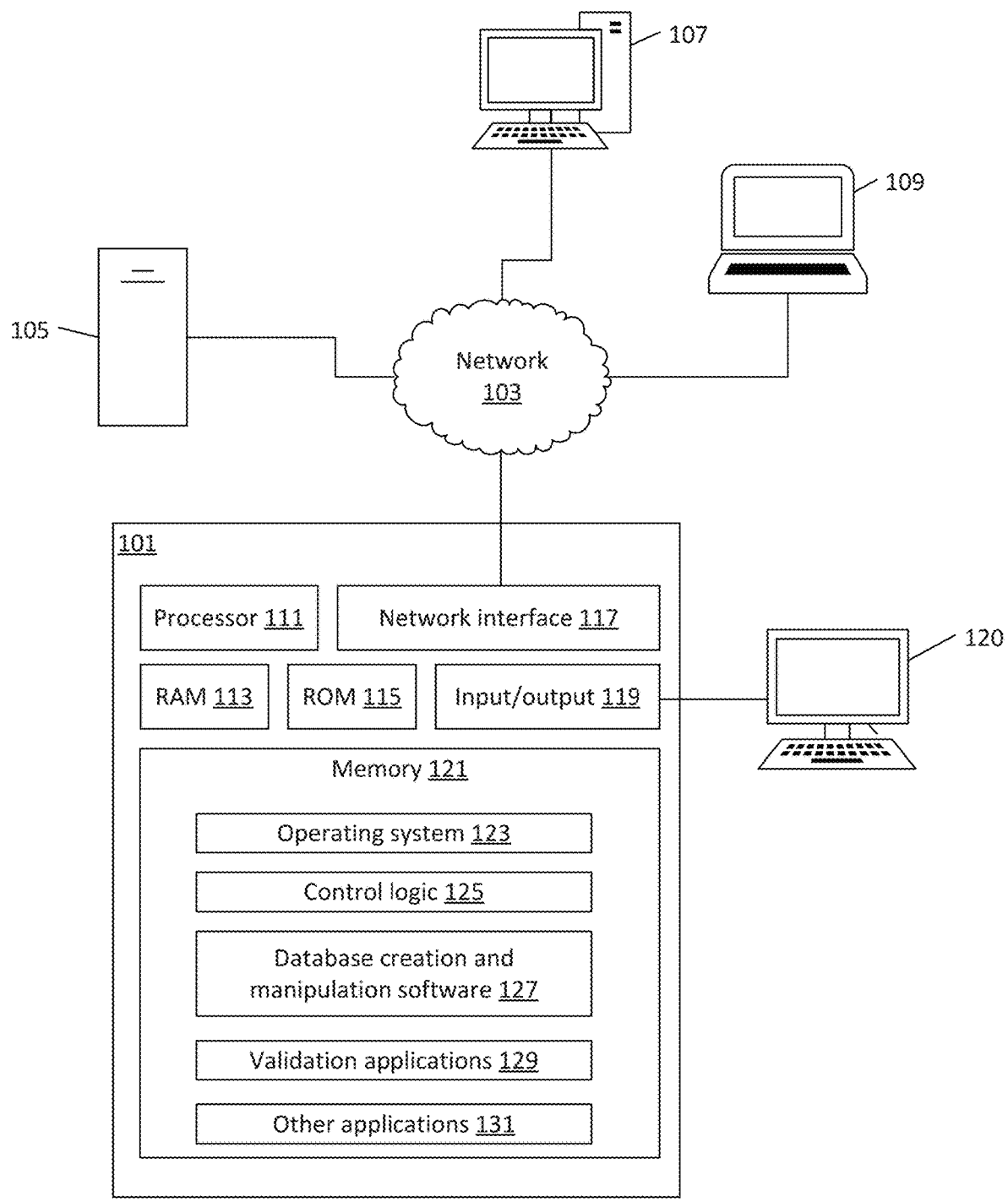
FIG. 1 shows an example computing device in accordance with one or more aspects described herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to data and/or resource validation techniques, including a real-time validation of data and/or resources based on one or more events or triggers, such as on the occurrence of a data change, deployment of an application, when the resource(s) are utilized, etc. The validation may be on demand (e.g., based on one or more events and/or triggers) and/or manually (e.g., via a call or via an application program interface (API) by a user).

A resource validation system according to one or more aspects may include a resource aggregator, a resource change listener (RCL), and/or one or more validators. The resource aggregator may be configured to aggregate data from multiple resources into a collection (e.g., a list, database, or other data structure) of unique resources based on one or more input filters.

The validator(s) may be configured to validate resource(s) based on one or more validation rules and provide validation result(s) as an output (e.g., to a validation results database). The validation rule(s) may be predefined. The validator(s) may be configured to register for one or more resources of specific types (e.g., register for applications, interest rates, and/or other data characteristics).

In one or more aspects, the validator(s) may be configured without the ability to retrieve data from the resource aggregator or other data sources. In this aspect, the validator(s) may subscribe to (and/or register with) necessary data and/or resources, and the RCL may be configured to provide the data and/or resources to the validator(s) based on such subscription(s). Additionally, or alternatively, one or more of the validators may be configured to retrieve data from the resource aggregator or other data source (e.g., without relying on the RCL providing the aggregated resource to the validator(s)). For example, the resource validation system may be configured to selectively operate in various operational modes, which may include: (1) a RCL provision mode—where the RCL is configured to retrieve data and/or resources from the resource aggregator or other data source and provide the retrieved data and/or resources to the validators (e.g., based on one or more subscriptions and/or registrations); (2) a validator access mode—where the validator(s) are configured to retrieve data and/or resources from the resource aggregator or other data source; and (3) a combination mode—where the RCL is configured to provide the retrieved data and/or resources to the validators and one or more validators are configured to retrieve data and/or resources from the resource aggregator or other data source.

The operational mode may be set based on one or more data and/or resource characteristics (e.g., size of the data and/or resource(s), storage location of data and/or resource(s), data access restrictions, etc.), one or more capabilities of the RCL and/or validator(s) (e.g., data processing capabilities of the RCL and/or validator(s)), performance characteristics of the system and/or one or more components therein (e.g., data transfer speeds, storage resources, power consumption, etc.), a user preference, or the like.

The RCL may be configured to fetch necessary resources from the resource aggregator. The fetching of the resource(s) by the RCL may be based on one or more events or triggers, such as a scheduled fetching, an on demand fetching (e.g., when the resource is utilized), and/or a manually fetching (e.g., via an API call). The RCL may call one or more validators that are registered for, subscribed to, or otherwise associated with, data and/or resource(s) of a particular type by passing the necessary data and/or resource(s) to be validated by the relevant validator(s). Additionally, or alternatively, the RCL may be configured to obtain validation results from the validators and provide the validation results as an output. For example, the RCL may provide the validation result(s) to a results database that stores the validation result(s). The validation result(s) may alternatively or additionally be provided to the validation results database by one or more respective validators.

The event and/or manual request may include one or more filters (e.g., parameters and/or other criteria) that may be used by the resource aggregator to identify data to be aggregated into one or more sets of resources matching specific criteria. The filter(s) may additionally or alternatively be used by RCL to fetch the resource(s) and/or set(s) of resources. An event may include, for example, a schedule (e.g., CRON job), a user trigger (e.g., a manual user request), a data change event (e.g., data change in a database), etc.

The resource validation system may be a serverless computing environment including one or more serverless applications that may use one or more anonymous functions (e.g., Lambda functions). For example, the resource aggregator, RCL, and/or validator(s) may be implemented by an anonymous function, such as a respective Lambda function (e.g., Amazon Web Service (AWS) Lambda function). The serverless application(s) offer a lightweight solution that provides resource validation functionality with improved efficiency with respect to resource utilization and energy consumption.

Before discussing the concepts of the disclosure in greater detail, however, several examples of a computing device that may be used in implementing and/or otherwise providing various aspects of the disclosure will first be discussed with respect to FIG. 1. FIG. 1 illustrates one example of a computing device 101 that may be used to implement one or more illustrative aspects discussed herein. For example, the computing device 101 may, in some aspects, implement one or more aspects of the disclosure by reading and/or executing instructions and performing one or more actions based on the instructions. In some aspects, the computing device 101 may represent, be incorporated in, and/or include various devices such as a desktop computer, a computer server, a cloud server, a mobile device (e.g., a laptop computer, a tablet computer, a smart phone, any other types of mobile computing devices, and the like), and/or any other type of data processing device. In an exemplary aspect, the computing device 101 may be embodied as a server (e.g. cloud server) adapted to execute one or more cloud-based application, such as one or more "serverless" applications, to perform aspect(s) of the disclosure.

The computing device 101 may, in some aspects, operate in a networked environment. In others, the computing device 101 may operate in a standalone environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media. Additionally, or alternatively, the computing device 101 and/or the network nodes 105, 107, and 109 may be a server hosting one or more databases. Databases may include, but are not limited to relational databases, non-relational databases, hierarchical databases, distributed databases, in-memory databases, flat file databases, XML databases, NoSQL databases, graph databases, and/or a combination thereof.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. Input/output 119 may include a variety of interface units and drives for reading, writing, displaying, and/or printing data or files. Input/output 119 may be coupled with a display such as display 120. Memory 121 may store software for configuring computing device 101 into a special purpose computing device in order to perform one or more of the various functions discussed herein. Memory 121 may store operating system software 123 for controlling overall operation of the computing device 101, control logic 125 for instructing the computing device 101 to perform aspects discussed herein, database creation and manipulation software 127, validation applications 129, and other application(s) 131. Control logic 125 may be incorporated in and may be a part of database creation and manipulation software 127. In other aspects, the computing device 101 may include two or more of any and/or all of these components (e.g., two or more processors, two or more memories, etc.) and/or other components and/or subsystems not illustrated here.

In an exemplary aspect, the validation application(s) 129 may include one or more applications configured to perform: data and/or resource aggregation operations; change listening operations; the creation, deletion, and/or modification of validation rule(s); the generation and/or processing of validation results, event and/or trigger monitoring, or the like. As discussed in more detail below, the validation application(s) 129 may be implemented in a serverless architecture, including being part of a virtual private cloud (VPC) of a cloud server. In this example, the computing device 101 may be a cloud server hosting one or more VPCs. Further, in an exemplary aspect, the validation application(s) 129 may include one or more anonymous functions, such as one or more Lambda functions, configured to perform the data and/or resource aggregation, change listening operations, data and/or resource validation, etc.

Devices 105, 107, 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125, software 127, networking and tracking applications 129.

The data transferred to and from various computing devices may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many aspects, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, JavaScript, or an equivalent thereof. The computer executable instructions may be stored on a computer readable medium such as a hard disk, optical disk, removable storage media, solid-state memory, RAM, etc. As will be appreciated by one of skill in the art, the functionality of the program modules may be combined or distributed as desired in various aspects. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product. Having discussed several examples of computing devices which may be used to implement some aspects as discussed further below, discussion will now turn to a method and serverless cloud-based architecture for network monitoring, including tracking and/or scraping webpage information.

Figure 2:
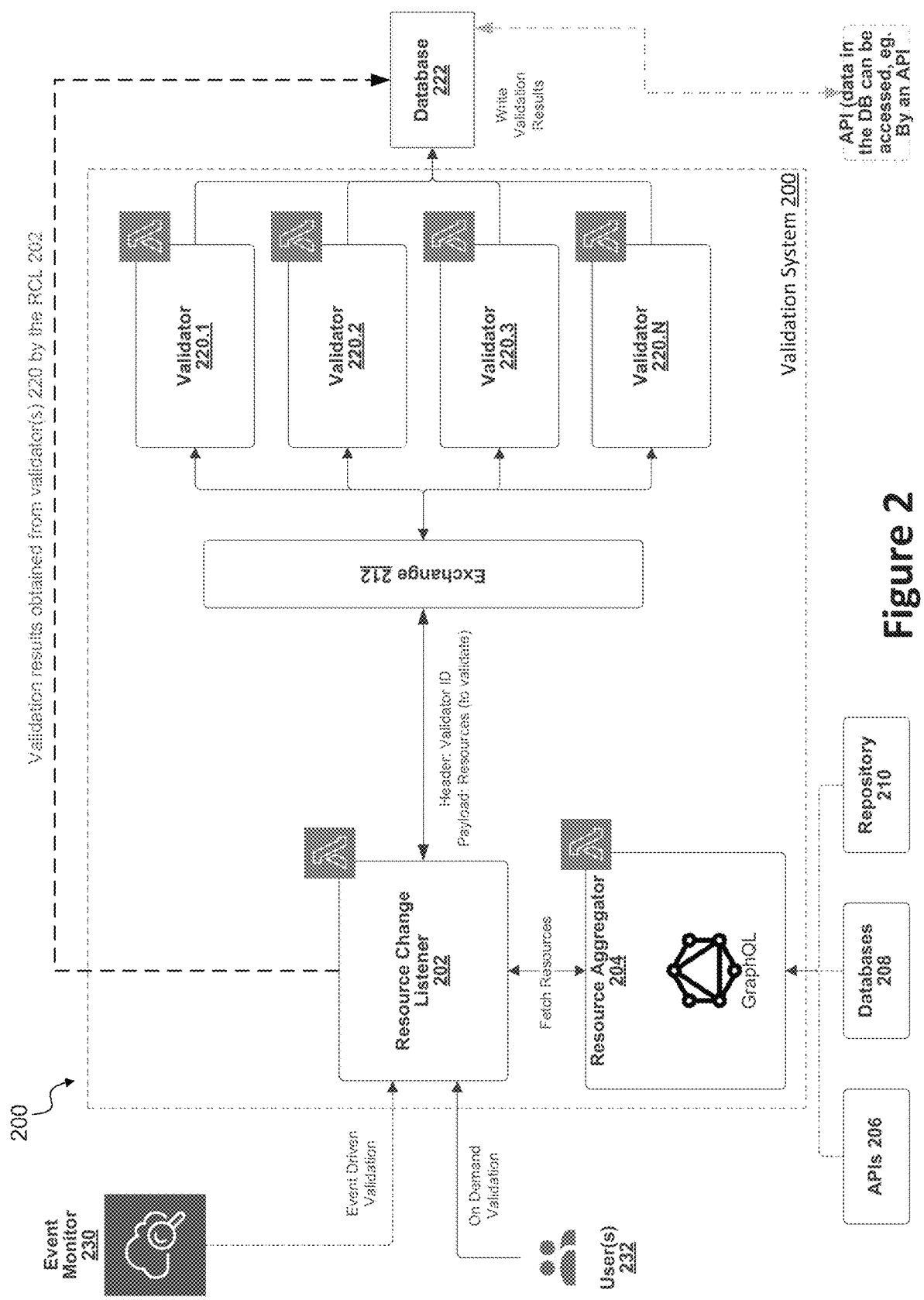
FIG. 2 shows a validation system according to one or more aspects of the disclosure.

FIG. 2 is a block diagram of a validation system 200. The validation system 200 (and/or one or more components therein) may be implemented by computing device 101. The validation system 200 may be distributed across two or more virtual and/or physical devices (e.g., devices 105, 107, 109). For example, the validation system 200 may be implemented as multiple, distributed servers, such as in a cloud-based computing environment. Further, a set of devices may perform one or more functions described as being performed by another set of devices. The validation system 200 may be an embodiment of the validation applications 129 of FIG. 1 in one or more aspects.

The validation system 200 may include a resource change listener (RCL) 202, resource aggregator, 204, and validator(s) 220. The RCL 202 may be connected to multiple of the validators 220 via an exchange 212 that is configured to negotiate communications between the RCL 202 and two or more validators 220.

The resource aggregator 204 may be configured to aggregate data from multiple resources and/or data sources into a collection (e.g., a list, database, or other data structure) of unique resources. For example, the resource aggregator 204 may generate an aggregated resource based on an aggregation of data of one or more data sources, such as data accessible by the resource aggregator 204 from one or more data sources via an API 206, database(s) 208, one or more repositories 210 (e.g., a searchable repository, such as Splunk), and/or other data sources.

The aggregation of the data by the data aggregator 204 may be based on a resource request from the RCL 202, where the resource request may include one or more filters (e.g., parameters and/or other criteria) that may be used by the resource aggregator 204 to identify data to be aggregated into the aggregated resource(s) matching specific criteria identified in the resource request (e.g., in the filter(s)). For example, the RCL 202 may provide a resource request to the resource aggregator 204 specifying data criteria, and the resource aggregator 204 may aggregate data from one or more data sources and provide the aggregate resource to the RCL 202. The data aggregator 204 may provide the aggregated resource(s) to the RCL 202 and/or the RCL 202 may be configured to retrieve the aggregated resource(s) from the data aggregator 204. In one or more aspects, the data aggregator 204 may provide the aggregated resource(s) to the RCL 202 based on the resource request and/or other request(s) from the RCL 202.

The RCL 202 may be configured to fetch/retrieve or otherwise obtain necessary resources from the resource aggregator 204. The fetching of the resource(s) by the RCL 202 may be based on the resource request. The resource request(s) may be based on one or more events or triggers, such as a scheduled fetching (e.g., based on an event from the event monitor 230), an on-demand fetching (e.g., when the resource is utilized), and/or a manually fetching (e.g., from one or more users, via an API call).

The RCL 202 may be configured to provide the aggregated resource(s) obtained from the resource aggregator 204 to one or more validators 220 based on one or more validator identifiers (IDs). For example, the RCL 202 may provide a validation package including the validator ID (e.g., as a header) and a corresponding payload including the aggregated resource(s) to be validated. In an exemplary aspect, the RCL 202 may be configured to call one or more validators 220 that are registered for, subscribed to, or otherwise associated with, data and/or resource(s) of a particular type by passing the necessary data and/or resource(s) to be validated by the relevant validator(s) 220.

The validator(s) 220 may be configured to validate resource(s) based on one or more validation rules (e.g., predefined validation rule(s)) and provide validation result(s) as an output (e.g., to a validation results database 222). For example, the validator(s) 220 may validate one or more resources, including one or more aggregated resources, obtained from the resource aggregator 204 via the RCL 202. In an exemplary aspect, the validator(s) 220 may include one or more validation algorithms configured to check if the aggregated resource(s) and/or data matches the validation rule(s).

The validator(s) 220 may be configured to determine validation results based on the validation of the resource(s) and store the validation results in the database 222. The database 222 may be accessible using an API to provide access to the validation results. Additionally, or alternatively, the validator(s) 220 may be configured to generate one or more notifications based on the validation results. The validator(s) 220 may be configured to register for one or more resources of specific types (e.g., register for one or more particular applications; types of data; and/or other data characteristics). For example, the validator(s) 220 may subscribe to (and/or register with) necessary data, resources, and/or data source(s). This subscription and/or registration information may be provided to the resource aggregator 204 by the RCL 202 (e.g. via the resource request), and the resource aggregator 204 may aggregate the relevant data to generate the aggregated resource, which the RCL 202 may then provide the associated validator(s) 220 for subsequent validation.

In the configuration illustrated in FIG. 2, the validator(s) 220 may lack the ability to retrieve data from the resource aggregator 204 and/or RCL 202 (and/or from other data source(s)). Therefore, the validator(s) 220 rely on the RCL 202 to provide the resources to the validator(s) 220 for validation.

In one or more aspects, as discussed in more detail below with reference to FIG. 3, the validator(s) 220 may be configured with the ability to retrieve data (e.g., aggregated resource(s)) from the resource aggregator 204 and/or other data source. In these aspect(s), the validator(s) 220 may directly fetch or otherwise obtain data and/or resources from the aggregator 204. Additionally, or alternatively, the resource aggregator 204 may be configured to provide the data and/or resources to the validator(s) 220 (e.g., when the validator(s) 220 lack the ability to fetch from the resource aggregator 204). In this example, the validation package (e.g. validation instruction) provided by the RCL 202 to the validator(s) 220 may include the validator ID (e.g., as a header) and a corresponding payload including the validation request (e.g., event information from the event monitor 230 and/or a manual request) identifying the resources to be validated. Based on this information, the validator(s) 220 may request the resource aggregator 204 to generate one or more aggregated resources based on the validation request and/or provide the validation request to the resource aggregator 204 to allow the resource aggregator 204 to determine the necessary resources to aggregate and then provide the aggregated resource to the validator(s) 220.

Figure 4:
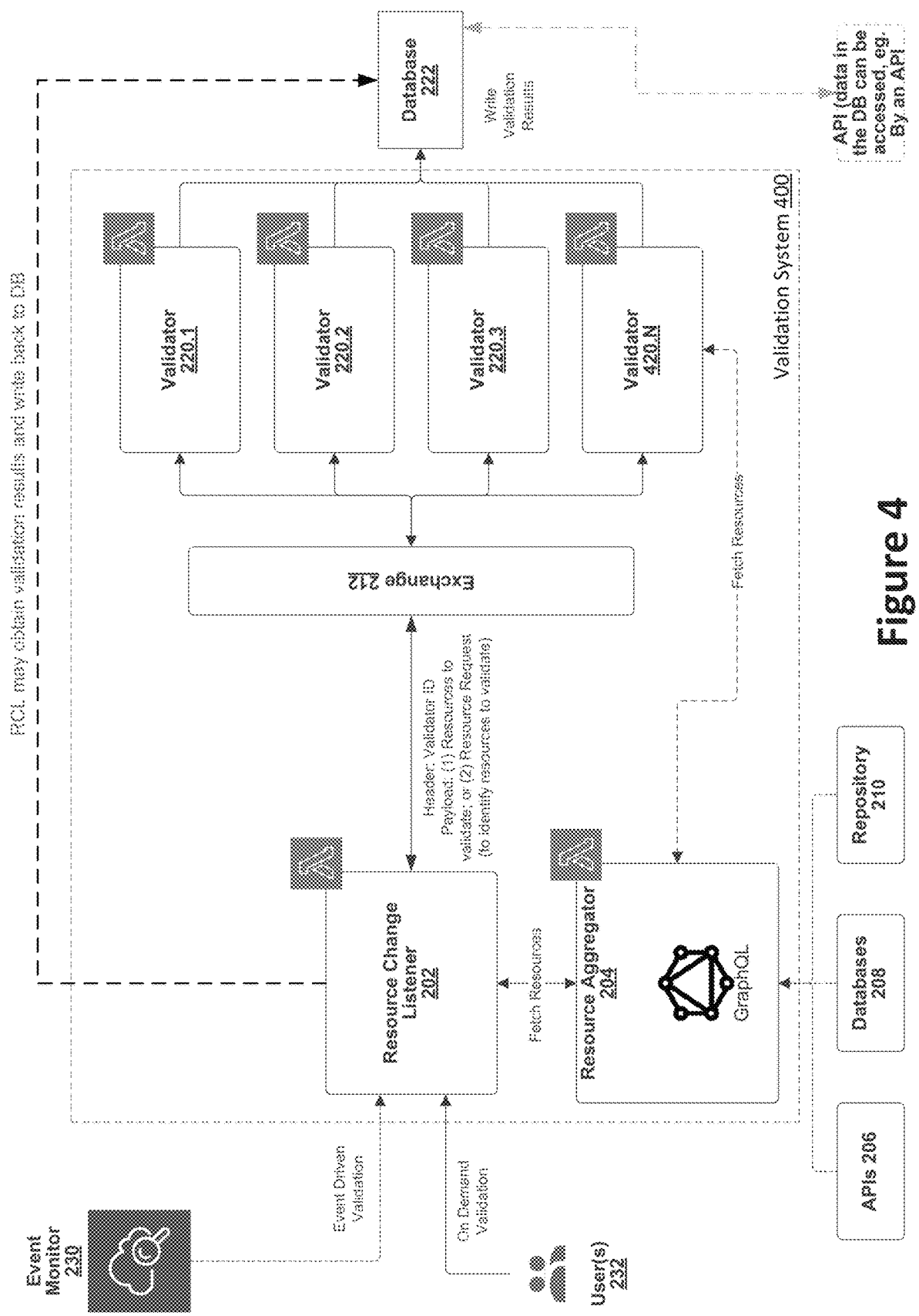
FIG. 4 shows a validation system according to one or more aspects of the disclosure.

FIG. 4 illustrates a block diagram of a validation system 400. The validation system 400 is similarly configured to the validation systems 200 and/or 300. In one or more aspects, the validation system 400 may be configured to selectively operate in various operational modes of the validation system 200 (e.g., RCL provision mode) and the validation system 300 (e.g., validator access mode), or a combination thereof. The operational modes may include: (1) a RCL provision mode—where the RCL 202 is configured to retrieve data and/or resources from the resource aggregator 204 or other data source, and provide the retrieved data and/or resources to the validators 220 (e.g., based on one or more subscriptions and/or registrations); (2) a validator access mode—where the validator(s) 220 are configured to retrieve (or otherwise obtain) data and/or resources from the resource aggregator or other data source; and (3) a combination mode—where the RCL 202 is configured to provide the retrieved data and/or resources (from the resource aggregator 204) to one or more validator(s) 220 and one or more validators 220 are configured to retrieve (or otherwise obtain) data and/or resources from the resource aggregator 204 or other data source(s).

In one or more aspects, the operational mode may be set based on one or more data and/or resource characteristics (e.g., size of the data and/or resource(s), storage location of data and/or resource(s), data access restrictions, etc.), one or more capabilities of the RCL 202 and/or validator(s) 220 (e.g., data processing capabilities of the RCL 202 and/or validator(s) 220), performance characteristics of the system 400 and/or one or more components therein (e.g., data transfer speeds, storage resources, power consumption, etc.), a user preference, or the like. Additionally, or alternatively, the operational mode may be set based on the validation request, which may include one or more characteristics of the validation request. For example, if the quantity of the data resources to be validated by the validators 220 is extensive, the validation system 400 may operate in the validator access mode such that the validators 220 may directly fetch the data from the resource aggregator 204 to reduce load on RCL 202 and prevent (or reduce the likelihood that) the RCL 202 from being overworked/overloaded having to fetch and provide that quantity of data. In one or more aspects, the validators 220 may be configured with different capabilities. For example, the one or more validators 220 may be configured with the capability to operation in the RCL provision mode (e.g., without the ability to fetch resources from the resource aggregator 204), while one or more other validators 220 may be configured with the capability to fetch resources from the resource aggregator 204 so as to operate in the validator access mode. As will be appreciated, the validators 220 may be differently configured or similarly configured.

Figure 3:
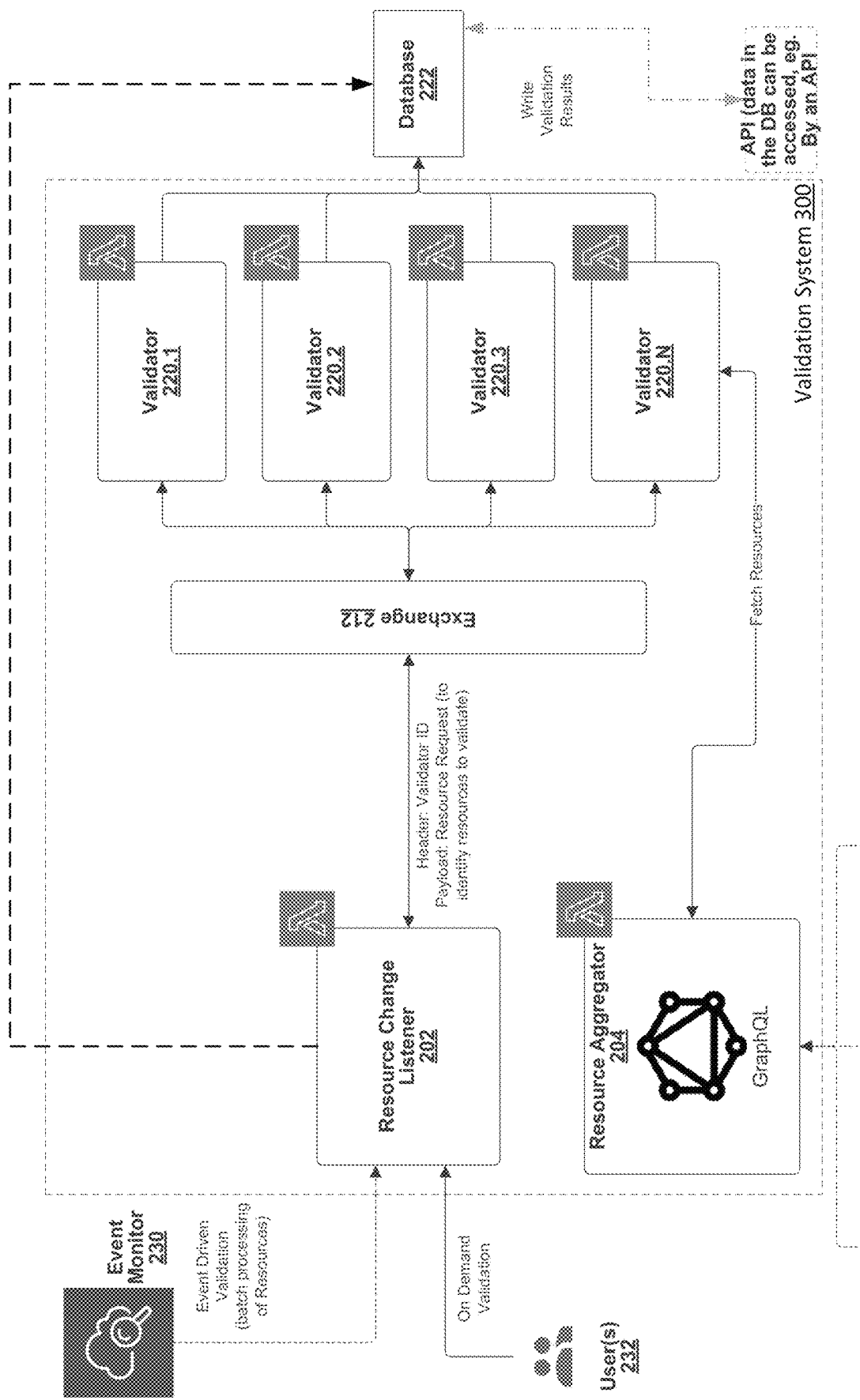
FIG. 3 shows a validation system according to one or more aspects of the disclosure.

As illustrated in FIGS. 2-4, the validation of data and/or resource(s) may be based on one or more resource requests in response to one or more events or triggers (e.g., validation request), which advantageously provides a real-time validation of the resource(s). For example, the validation may be an event-driven validation in which the resource request from the RCL 202 is based on a validation request associated with an event or other trigger monitored by event monitor 230. The event monitor 230 may monitor events, which may include a scheduled event (e.g., CRON job), detected data change, detected resource utilization, etc. For example, the event monitor 230 may be configured to monitor: data sources (e.g., access of data, modification of data, etc.), applications (e.g., utilization of an application, milestone for the application, etc.), and/or other resources. The monitoring can watch for modifications and/or usage of the data, applications, and/or other resources.

In an exemplary aspect, the RCL 202 may be configured to perform one or more functions based on (e.g., in response to) an event notification, a request, and/or a command. The event monitor 230 may be configured to generate one or more event notifications and/or commands based on the occurrence of one or more events (e.g., a date and/or time, expiration of a timer, etc.) and/or monitored aspects of the data sources (e.g., database 208, repository 210), applications, and/or one or more other external devices and/or resources. The events may include, for example, the occurrence of a specified time and/or date, an expiration of a timer, the occurrence of one or more statuses of one or more monitored data sources, resources, applications, and/or another event occurrence, and/or functions of the validation system 200, 300, 400 (or one or more components therein). Additionally, or alternatively, the event monitor 230 may collect and track metrics (e.g., measurements of variable(s) for resource(s), application(s), data sources, and/or function(s), create one or more alarms and/or triggers configured to monitor the metric(s), generate one or more notifications (e.g., based on the metric tracking, validation results from the validator(s) 220, and/or other monitoring functions). The event monitor 230 may (e.g., automatically) adapt one or more resources, data sources, applications, and/or functions of the validation system 200, 300, 400 (or one or more components therein). The adaptation may be based on the metric tracking and/or other monitoring functions in one or more aspects. In one or more aspects, the event monitor 230 may be implemented using a serverless event monitor, such as AWS CloudWatch.

In an exemplary aspect, the resource validation system 200, 300, 400 may be a serverless computing environment including one or more serverless applications that may use one or more anonymous functions (e.g., Lambda functions). For example, the RCL 202, resource aggregator 204, and/or validator(s) 220 may be implemented by an anonymous function, such as a respective Lambda function (e.g., Amazon Web Service (AWS) Lambda function). The Lambda functions may include functions that may be used by higher-order functions, such as those functions performed by validation system 200, 300, 400. Lambda functions may be used by other Lambda functions and/or used by non-Lambda functions to perform complex processing operations of the validation system 200, 300, 400. The serverless application(s) offer a lightweight solution that provides resource validation functionality with improved efficiency with respect to resource utilization and energy consumption.

In an exemplary aspect, one or more operations/functions of the validation system 200, 300, 400 and/or components therein (e.g., RCL 202, resource aggregator 204, validator 220) may be performed using a machine learning (ML) model. For example, the validation of data and/or resources may be validated using the ML model. The machine learning model may support a generative adversarial network, a bidirectional generative adversarial network, an adversarial autoencoder, transformer-based network (e.g., Seq2Seq), or an equivalent thereof. Additionally, or alternatively, the machine learning model may be a neural network, such as a convolutional neural network (CNN), a recurrent neural network, a recursive neural network, a long short-term memory (LSTM), a gated recurrent unit (GRU), an unsupervised pretrained network, a space invariant artificial neural network, a generative adversarial network (GAN), or a consistent adversarial network (CAN), cyclic generative adversarial network (C-GAN), a deep convolutional GAN (DC-GAN), GAN interpolation (GAN-INT), GAN-CLS, a cyclic-CAN (e.g., C-CAN) or any equivalent thereof. Additionally, or alternatively, the one or more ML models may comprise one or more decision trees. In some instances, the one or more machine learning models may comprise a Hidden Markov Model. The ML model may be trained based on input data (e.g., validation requests) and/or output data (e.g., validation results), feedback provided by one or more users via the user interface, and/or or other information. The machine learning model may be trained using different training techniques, such as supervised training, unsupervised training, semi-supervised training back propagation, transfer learning, stochastic gradient descent, learning rate decay, dropout, max pooling, batch normalization, and/or any equivalent deep learning technique.

Figure 5:
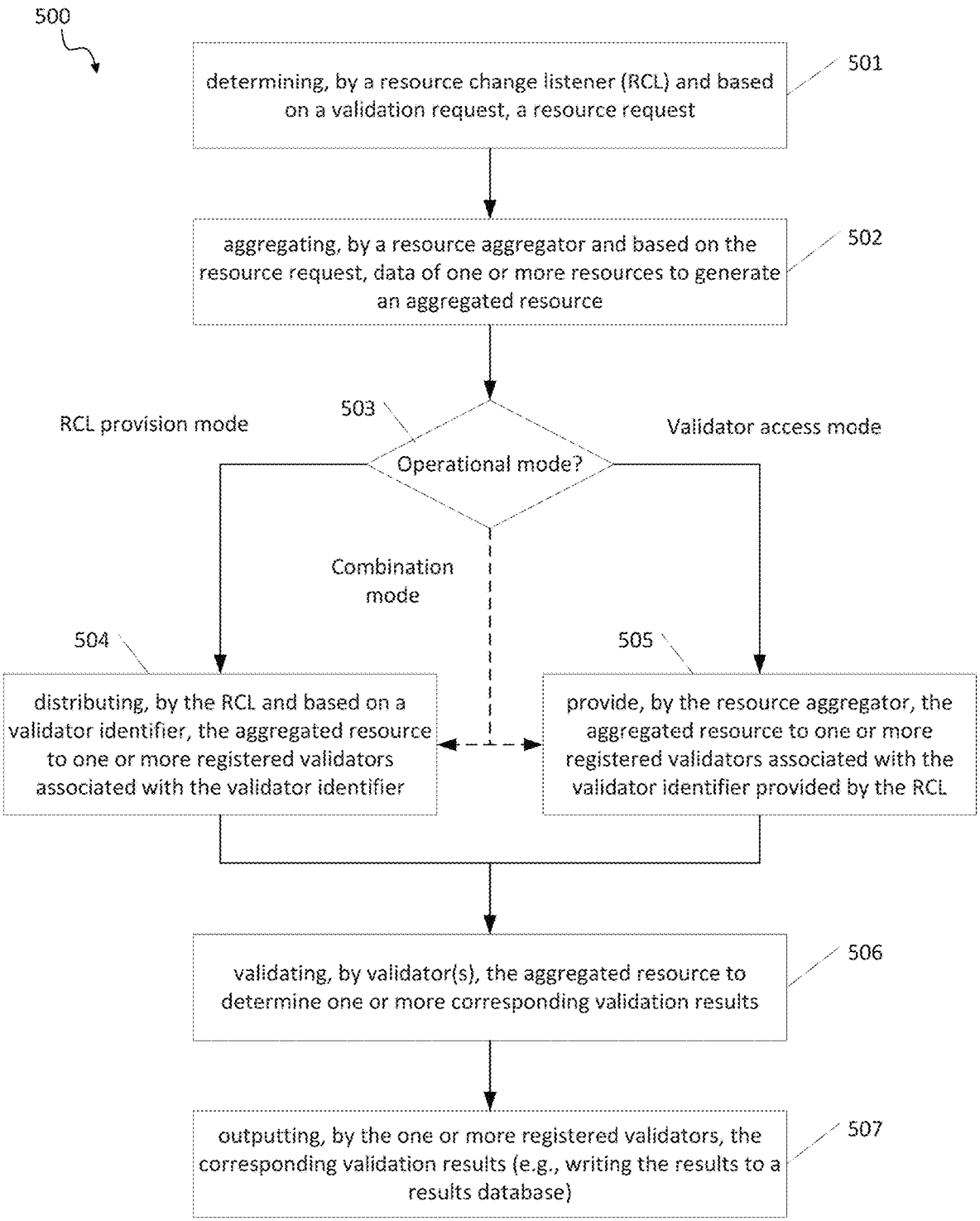
FIG. 5 shows a flowchart for a resource validation method according to one or more aspects of the disclosure.

FIG. 5 is a flowchart for resource validation method 500. Some or all of the operations of process 500 may be performed using one or more computing devices as described herein, such as computing device 101. Operations may be performed sequentially, at least partially concurrently, concurrently, or simultaneously. Additionally, or alternatively, the operation(s) may be iteratively performed (e.g., until one or more conditions is satisfied).

The process 500 begins as operation 501, where a resource request is determined. The resource request may be determined by the resource change listener (RCL) 202 and based on a validation request received by the RCL 202. The validation request may be event-driven, such as a validation request generated by the event monitor 230, and/or may be a manual validation request by one or more users 232.

The process 500 transitions to operation 502, where one or more resources and/or data is aggregated to generate one more aggregated resources. In an exemplary aspect, the resource aggregator 204 may aggregate data and/or resources from one or more data sources, such as databases 208, repositories 210, and/or other data sources (e.g., via an API). The resource aggregator may aggregate the data and/or resources based on the resource request.

The process 500 transitions to operation 503, where the operational mode of the validation system is determined. The validation system 400 may be configured to selectively operate in various operational modes. The operational mode may be determined by the validation system 400 and/or one or more components therein (e.g., RCL 202). In one or more aspects, validation applications 129 executed by processor 111 may be configured to determine the operational mode. The operational mode may be set based on one or more data and/or resource characteristics (e.g., size of the data and/or resource(s), storage location of data and/or resource(s), data access restrictions, etc.), one or more capabilities of the RCL 202 and/or validator(s) 220 (e.g., data processing capabilities of the RCL 202 and/or validator(s) 220), performance characteristics of the system 400 and/or one or more components therein (e.g., data transfer speeds, storage resources, power consumption, etc.), a user preference, or the like. Additionally, or alternatively, the operational mode may be set based on the validation request, which may include one or more characteristics of the validation request.

The operational modes may include: (1) a RCL provision mode—where the RCL 202 is configured to retrieve data and/or resources from the resource aggregator 204 or other data source, and provide the retrieved data and/or resources to the validators 220 (e.g., based on one or more subscriptions and/or registrations); (2) a validator access mode—where the validator(s) 220 are configured to retrieve (or otherwise obtain) data and/or resources from the resource aggregator or other data source; and (3) a combination mode—where the RCL 202 is configured to provide the retrieved data and/or resources (from the resource aggregator 204) to one or more validator(s) 220 and one or more validators 220 are configured to retrieve (or otherwise obtain) data and/or resources from the resource aggregator 204 or other data source(s).

In the RCL provision mode, the process 500 transitions to operation 504, where the aggregated resource(s) determined by the resource aggregator 204 may be distributed. The RCL 202 may distribute the aggregated resource(s) to the relevant validator(s) 220 based on one or more validator IDs included in a validation instructions provided by the RCL 202 to the validator(s) 220. The validation instructions may also include the aggregated resource(s) obtained by the RCL 202 from the resource aggregator 204.

In the validator access mode, the process 500 transitions to operation 505, where the aggregated resources determined by the resource aggregator 204 may be provided to (and/or retrieved by) one or more validators 220. The resource aggregator 204 may provide the aggregated resources to the corresponding validator(s) 220 based on a validator ID included in the validation instructions provided by the RCL 202. In this example, the payload of the validation instructions may include the resource request and/or other information instructing the validator(s) 220 on what data and/or resources are to be validated.

In the combination mode, the process 500 transitions to operations 505 and 506, where one or more validators 220 may operate in the RCL provision mode and one or more validators 220 may operate in the validator access mode.

Following operations 504 and/or 505, the process 500 transitions to operation 506, where one or more aggregated resources are validated by one or more validators 220. Based on the validation(s), the validator(s) 220 may generate one or more validation results.

The process 500 transitions to operation 507, where the validation result(s) may be output by the validation system. For example, the validation result(s) may be written to database 222 to store the validation result(s). Additionally, or alternatively, the validator(s) 220 may generate one or more notifications corresponding to the validation results.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) Python, Perl, or any other suitable scripting language. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Any sequence of computer-implementable instructions described in this disclosure may be considered to be an "algorithm" as those instructions are intended to solve one or more classes of problems or to perform one or more computations. While various directional arrows are shown in the figures of this disclosure, the directional arrows are not intended to be limiting to the extent that bi-directional communications are excluded. Rather, the directional arrows are to show a general flow of steps and not the unidirectional movement of information. In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software. In addition, terms such as " . . . unit," " . . . module" described in the specification mean a unit for performing at least one function or operation, which may be implemented as hardware or software, or as a combination of hardware and software. Throughout the specification, expression "at least one of a, b, and c" may include 'a only,' 'b only,' 'c only,' 'a and b,' 'a and c,' 'b and c,' and/or 'all of a, b, and c.'

It is noted that various connections between elements are discussed in the following description. It is noted that these connections are general and, unless specified otherwise, may be direct or indirect, and that the specification is not intended to be limiting in this respect. As described herein, thresholds are referred to as being "satisfied" to generally encompass situations involving thresholds above increasing values as well as encompass situations involving thresholds below decreasing values. The term "satisfied" is used with thresholds to address when values have passed a threshold and then approaching the threshold from an opposite side as using terms such as "greater than," "greater than or equal to," "less than," and "less than or equal to" can add ambiguity where a value repeated crosses a threshold.

What is claimed is:

1. A computer-implemented method comprising:
    determining training data comprising:
        a history of validation requests, wherein each historical validation request identifies one or more resources to be aggregated and validated; and
        an indication of validation results corresponding to each historical validation request:
    generating a trained machine learning model by training, using the training data, a machine learning model to perform validation of input aggregated resources;
    tracking metrics by monitoring activity of serverless applications;
    generating, based on determining that the metrics satisfy a threshold corresponding to a change in status of one or more of the serverless applications, a resource request;
    aggregating, based on the resource request, data of one or more resources to generate an aggregated resource;
    distributing, based on a validator identifier, the aggregated resource to one or more registered validators associated with the validator identifier;
    validating the aggregated resource by:
        providing, to the trained machine learning model, at least a portion of the aggregated resource; and
        determining, based on output of the trained machine learning model, validation results; and
    writing the validation results to a results database.

2. The computer-implemented method of claim 1, further comprising generating a notification based on the validation results.

3. The computer-implemented method of claim 1, further comprising:
    detecting by an event monitor, a change of a data resource; and
    generating the resource request based on the detected change of the data resource.

4. The computer-implemented method of claim 1, further comprising:
    determining, based on a second validation request, a second resource request;
    aggregating, based on the second resource request, data of the one or more resources to generate a second aggregated resource;
    distributing, based on a second validator identifier, the second aggregated resource to one or more registered validators associated with the second validator identifier;
    validating the second aggregated resource to determine one or more other corresponding validation results;
    retrieving, from the one or more registered validators, the one or more other corresponding validation results; and
    writing the one or more other corresponding validation results to the results database.

5. The computer-implemented method of claim 1, further comprising:
    determining, based on a second validation request, a second resource request;
    aggregating, based on the second resource request, data of the one or more resources to generate a second aggregated resource;
    distributing, based on a second validator identifier, the second resource request to one or more registered validators associated with the second validator identifier;
    fetching the second aggregated resource based on the second resource request;
    validating the second aggregated resource to determine one or more other corresponding validation results; and
    writing the validation results to the results database.

6. The computer-implemented method of claim 1, further comprising fetching, based on the resource request, the data of the one or more resources.

7. The computer-implemented method of claim 1, further comprising:
    determining, based on the resource request, one or more registered validators; and
    determining, based on the determined one or more registered validators, the validator identifier.

8. The computer-implemented method of claim 1, wherein a Lambda function is configured to distribute the aggregated resource to the one or more registered validators associated with the validator identifier.

9. The computer-implemented method of claim 8, wherein the Lambda function is configured to combine the validator identifier and the aggregated data of the one or more resources to generate the aggregated resource.

10. The computer-implemented method of claim 1, wherein aggregating the data of the one or more resources comprises:
    accessing the one or more resources to retrieve the data; and
    aggregating the retrieved data to generate the aggregated resource.

11. The computer-implemented method of claim 10, wherein the one or more resources comprises a data source accessible using an application programming interface (API).

12. The computer-implemented method of claim 1, further comprising generating the resource request based on an event trigger.

13. The computer-implemented method of claim 1, further comprising receiving, by a user interface and from a user, the resource request.

14. A computing device comprising:
    one or more processors; and
    memory storing instructions that, when executed by the one or more processors, configure the computing device to:
        determine training data comprising:
            a history of validation requests, wherein each historical validation request identifies one or more resources to be aggregated and validated; and
            an indication of validation results corresponding to each historical validation request;

generating a trained machine learning model by training, using the training data, a machine learning model to perform validation of input aggregated resources;

tracking metrics by monitoring activity of serverless applications;

generating, based on determining that the metrics satisfy a threshold corresponding to a change in status of one or more of the serverless applications, a resource request;

aggregate, based on the resource request, data of one or more resources to generate an aggregated resource;

distribute, based on a validator identifier, the aggregated resource to one or more registered validators associated with the validator identifier;

validate the aggregated resource by:
providing, to the trained machine learning model, at least a portion of the aggregated resource; and
determining, based on output of the trained machine learning model, validation results; and generate a notification based on the validation results.

15. The computing device claim 14, wherein the instructions, when executed by the one or more processors, further configure the computing device to write the corresponding validation results to a results database.

16. The computing device claim 14, wherein the instructions, when executed by the one or more processors, further configure the computing device to:
retrieve the validation results; and
write the validation results to a results database.

17. The computing device claim 14, wherein a Lambda function is configured to validate the aggregated resource to determine one or more corresponding validation results.

18. The computing device claim 14, wherein the one or more registered validators comprise one or more predefined validation rules, the validation results being determined based on the one or more predefined validation rules.

19. One or more non-transitory media storing instructions that, when executed, cause a computing device to:
determine training data comprising:
a history of validation requests, wherein each historical validation request identifies one or more resources to be aggregated and validated; and
an indication of validation results corresponding to each historical validation request:
generate a trained machine learning model by training, using the training data, a machine learning model to perform validation of input aggregated resources;
track metrics by monitoring activity of serverless applications;
generate, based on determining that the metrics satisfy a threshold corresponding to a change in status of one or more of the serverless applications, a resource request;
aggregate, based on the resource request, data of one or more resources to generate an aggregated resource;
distribute, based on a characteristic of the aggregated resource, the aggregated resource to one or more registered validators;
validate, by the one or more registered validators, the aggregated resource by:
providing, to the trained machine learning model, at least a portion of the aggregated resource; and
determining, based on output of the trained machine learning model, validation results; and
generate a notification based on the validation results.

20. The one or more non-transitory media of claim 19, wherein the characteristic of the aggregated resource is a data size of the aggregated resource.

* * * * *